United States Patent [19]
Ofria, Jr.

[11] Patent Number: 6,027,258
[45] Date of Patent: Feb. 22, 2000

[54] STEADY CAMERA MOUNT SYSTEM

[75] Inventor: Russell Ofria, Jr., Northridge, Calif.

[73] Assignee: Advanced Camera Systems, Inc., Van Nuys, Calif.

[21] Appl. No.: 09/156,857

[22] Filed: Sep. 18, 1998

[51] Int. Cl.[7] .................................................. G03B 17/00
[52] U.S. Cl. .......................................... 396/428; 352/243
[58] Field of Search ................................ 396/12, 13, 419, 396/420, 421, 425, 428; 352/243; D16/242, 243

[56] References Cited

U.S. PATENT DOCUMENTS

| | | | |
|---|---|---|---|
| D. 329,449 | 9/1992 | Brown et al. | D16/243 |
| 3,589,260 | 6/1971 | Ferra | 396/419 |
| 4,017,168 | 4/1977 | Brown | 352/243 |
| 4,206,983 | 6/1980 | Nettman et al. | 352/243 |
| 4,989,466 | 2/1991 | Goodman | 352/243 X |
| 5,243,370 | 9/1993 | Slater | 352/243 |
| 5,360,196 | 11/1994 | DiGiulio et al. | 396/428 X |
| 5,429,332 | 7/1995 | Ishikawa | 352/243 X |
| 5,435,515 | 7/1995 | DiGiulio et al. | 396/428 X |
| 5,579,071 | 11/1996 | Wetzel et al. | 396/428 |
| 5,737,657 | 4/1998 | Paddock et al. | 396/428 |
| 5,853,153 | 12/1998 | Condrey | 396/428 X |
| 5,908,181 | 6/1999 | Valles-Navarro | 396/428 X |

*Primary Examiner*—Howard B. Blankenship
*Attorney, Agent, or Firm*—Oppenheimer Wolff & Donnelly LLP

[57] ABSTRACT

A mounting system for minimizing pointing error in image capture equipment having a first support member rotatable about a first axis and a second support member rotatable about a second axis, the second support member including an adjustable mount allowing the image capture equipment mounted to be positioned so that the center of mass of structure rotatable about the second axis is on the second axis, and the first support member includes an adjustable positioner allowing the second support member position to be adjusted along the second axis so that the center of mass of structure rotatable about the first axis is on the first axis, and further including two hand grips carried by the second support member and positioned equidistant from the second axis of rotation and on a line passing through the second axis of rotation.

20 Claims, 4 Drawing Sheets

STEADY CAMERA MOUNT SYSTEM

BACKGROUND

1. Field of the Invention

The invention relates generally to mounting systems for photographic and other image capture equipment. More specifically, the invention relates to improved mounting systems for stabilization of such equipment in applications where the equipment and operator may be subject to forces which may cause a force differential and/or a difference of movement between the camera and the operator, such force differential tending to introduce pointing error and/or unwanted movement of the image capture equipment.

2. Description of the Related Art

In conventional mounting of image capture equipment, which herein will be understood to encompass various kinds of imaging equipment, though previously the art was directed primarily to motion picture photographic equipment for example, stabilization of the equipment is desirable. Whether applicable to photographic, video, digital image, or another form of image capture equipment, which for convenience of reference will be herein referred to as a "camera" and the process of image capture as "photographing" though it is not intended that any limitation should be implied therefrom, the quality of the image sought to be recorded can easily be degraded due to unwanted movement of the camera. Such unwanted movement can be translational or rotational. As will be appreciated, unwanted rotational movement generally produces more striking and unwanted movement of the recorded image and is therefore particularly to be avoided.

As an example, recent innovations in camera mounting systems involving counterbalancing, gyrostabilization, and the like, directed to creating a more steady camera mount in applications where the camera is intended to move during photographing, have been developed to produce a more stable image and thus expand the range of photographic possibilities available. This is beneficial for example in cinematography were wider creative possibilities have been created through application of such technological advances. Nevertheless new problems of stabilization are continuously being encountered as new possibilities in camera mounting are being exploited. Also, problems inherent in conventional equipment have not been entirely overcome by recent advancements.

As an example, in mounting a camera on a moving vehicle, be it a land, water, or air craft for example, the camera will be subjected to forces induced by vehicle movement. Acceleration, deceleration, centripetal, centrifugal, oscillatory and vibratational forces, to name a few ways of characterizing them, act on the camera, as well as the camera operator in applications where the camera is directly operator controlled.

To stabilize the camera, and thereby the recorded image, the aforementioned advancements in camera mounting are applied. For example the camera can be mounted on a counterbalanced beam and provided with a mounting providing multiple degrees of freedom and means for biasing the camera to a desired orientation, thus compensating for and mitigating the effects these forces have upon the camera.

Towards this end it is often desirable to locate the center of mass of the camera so that the set-up of the mounting system can be accomplished and counter weighting and neutral balance of the mounted camera, for example, can be readily accomplished. However this is often not straightforward as differing configurations of the camera will give different centers of mass. One solution is to customize the mounting arrangement for a particular camera from a particular manufacturer set up in a particular way. This simplifies mounting but, as will be appreciated, limits applicability of the system to that of the particular camera used. This can be problematic where creative considerations, for example, dictate use of another camera set up.

Further, in known counter-balanced beam mounting systems that support a camera from a structure mounted on a vehicle and which allow manual control of panning, tilting, and horizon motion, an arm or a pair of arms are used to control the camera. These arms are not in line with the center of mass of the camera and its supporting structure, and they provide leverage which minimizes the force necessary to rotate the camera around the axes of rotation inherent in the supporting mounting system.

SUMMARY

It has been recognized that this leverage can work against stability in applications such as that described above, where the camera and its mounting system and the operator are subjected to forces. Due to differences in response of the mounting system and/or camera and the body of the operator to these forces, differential forces between the operator and the camera are induced. These forces can be transferred to the camera and produce unwanted motion of the camera and give rise to pointing error and destabilization of the recorded image.

Known systems transfer such undesirable differential forces relatively effectively due to the arm or arms transferring force in the aggregate through a point other than the center of mass of the camera. Almost any time there is a difference between the operator's motion and the motion of the camera this problem occurs. Operator skill cannot entirely null out the undesirable effect, and in many instances a de-stabilized recorded image results. It has been recognized that solving this problem will result in improved image quality and reduce waste due to the necessity to re-shoot for example due to an error thus induced which degrades the image to the point that it is not usable.

The invention accordingly provides a mounting system for a camera having a center of mass including a camera mount rotatable about an axis of rotation. The mount is configured for adustablity so that the center of mass of the camera and any structure that rotates with the camera can be located so as to lie on the axis of rotation. A pair of operator hand grips are provided and are connected to the camera mount by arms, the grips and arms rotating with the camera about the axis of rotation, and the grips being positioned so that an imaginary line having an endpoint located at each hand grip will have a midpoint which lies on the axis of rotation.

As will be appreciated the invention mitigates pointing error due to differential forces as net forces induced are transferred to the camera through the grips positioned so that they act though a point on the axis of rotation of the camera. The grips can be set up so that the opposing places where an operator grasps the grips are in line with the center of mass of the camera, so that an imaginary line constructed with an end point at each grip passes through the center of mass of the camera and attached structure. As a result forces applied by reason of differential movement will not induce a moment about an axis orthogonal to the axis of rotation.

The mounting system for a camera according to the invention can include a first support member rotatable about a first axis of rotation, and a second support member including arms and operator hand grips, the second support member being carried by the first support member and rotatable about a second axis of rotation orthogonal to the first axis of rotation, the two axes of rotation intersecting at a point of intersection. The mounting system can further include a camera mount attached to the second support member, the mount accommodating adjustability of the location of the camera with respect to the second support member so that the center of mass of the combination of the camera and the second supporting member and mount (structure rotatable about the second axis of rotation) can be positioned so as to lie on the second axis of rotation. The first support member can be provided with a means for adjustment of the location of the second support member with respect to the first support member along the second axis of rotation so that the center of mass of the first and second support members and the mount and camera (all structure rotatable about the first axis) can be positioned on the first axis, and when so adjusted a line having an endpoint at each hand grip will have a midpoint at the point of intersection.

As a result of the invention as just described a camera can be mounted which does not have a readily apparent center of mass and by adjustment of the location of the camera with respect to the second support member, and adjustment of the location of the second member with camera mounted with respect to the first support member, which adjustments can be performed by balancing the system so as to minimize gravity-induced rotation about the first and second axes, a system where the center of mass of the camera and supporting members coincides with the intersection of the axes of rotation of the system, mitigating a tendency to rotate due to induced forces on the system. The grips can be located so that differential forces between the camera system and operator will act through the point of intersection of the first and second axes, thereby mitigating pointing error that could otherwise be introduced, as the net resultant force of forces applied equally to both grips will act through the midpoint of an imaginary line between them and this midpoint can be made to coincide with said point of intersection of the first and second axes.

Further aspects of the invention will be apparent with reference to the following detailed description, taken together with the accompanying drawing, which illustrate by way of example principles of the invention.

BRIEF DESCRIPTION OF THE DRAWINGS

In order to appreciate more fully the manner in which the advantages and objects of the invention are obtained, a more particular description of exemplary embodiment(s) of the invention will be given with reference to specific embodiment(s) which are illustrated in the appended drawings. With the understanding that these drawings only depict presently preferred embodiment(s) of the invention, and are not therefore to be considered limiting of its scope, the invention will be further described with additional specificity and detail through use of the drawings in which.

DETAILED DESCRIPTION OF PRESENTLY PREFERRED EMBODIMENT(S)

Figure 1:
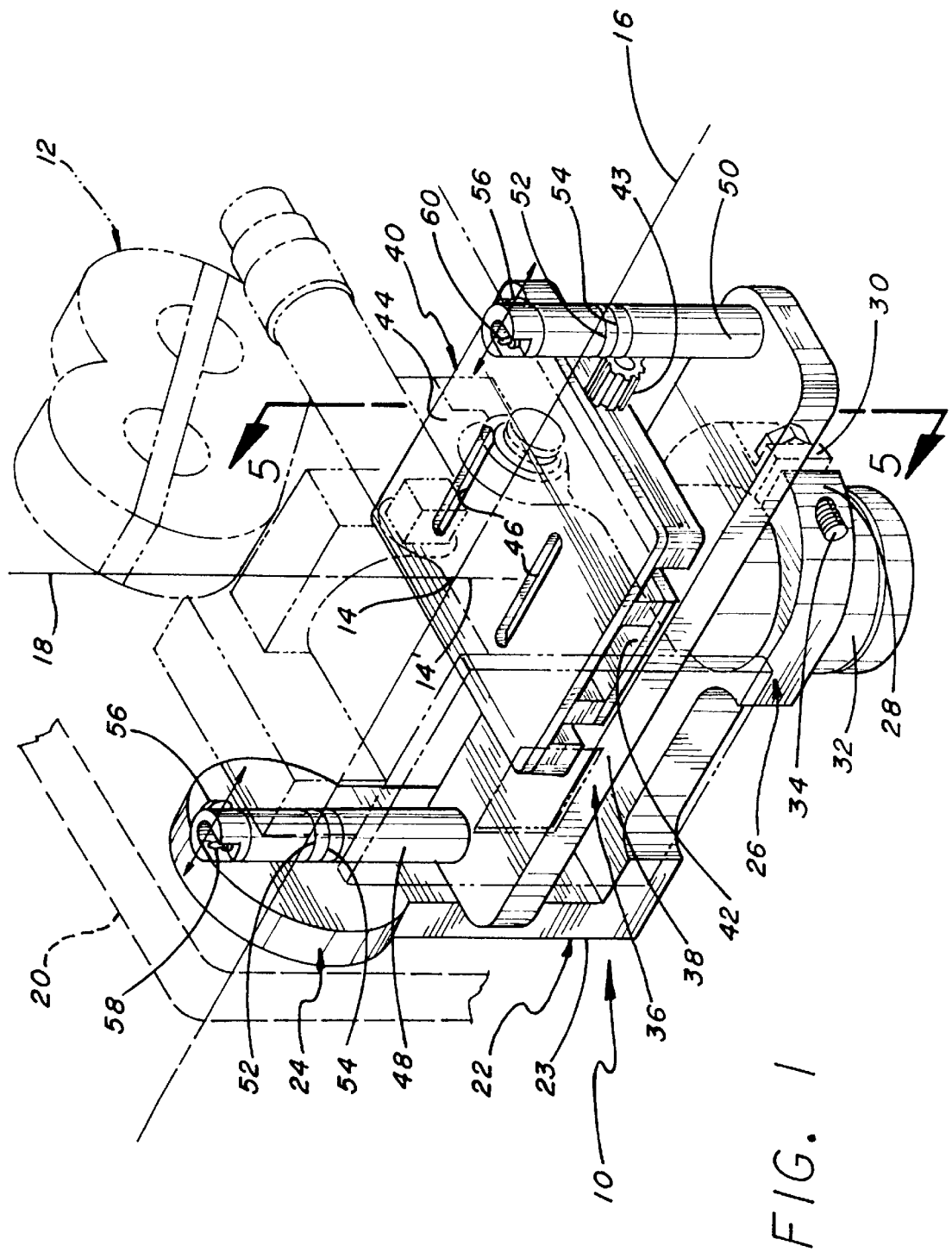
FIG. 1 is a perspective view of a mounting system according to the invention, with a mounted camera shown in phantom, illustrating an embodiment of the present invention.

As shown in FIG. 1, a mounting system 10 for an image capture device such as a motion picture camera 12 is provided, which mitigates the effect of differential forces acting on an operator (not shown) and the system which would otherwise tend to introduce pointing error by directing such differential forces through a point 14 comprising an intersection of two orthogonal axes 16, 18 of rotation of the mounting system. The system accommodates placement of the center of mass of the mounting system components rotatable about these axes also at this point so that pointing errors due to forces induced on the system by accelerations are mitigated, being directed through this intersection point, and accordingly not inducing a tendency to rotate about either axis.

The mounting system depends from a supporting structure 20, such as a counterbalanced beam, for example, enabling the camera mounting system 10 with a camera 12 mounted to "float" and lessens or even substantially eliminates transmission of transient movement deviations to the camera from a platform on which the supporting structure is mounted. The moving platform could be a truck, airplane, or water craft, to name a few examples, and other applications will be apparent to those skilled in the art. The supporting structure could also be an L-shaped member (not shown) which extends above the camera and mounting system of the invention, which may also be in turn attached to a counterbalanced beam for example. In any case a first support member 22 is rotatably attached to the supporting structure by means of a bearing (not shown) of conventional configuration, such as a single or multiple race ball bearing for example, which allows rotation of the first support member about a first axis of rotation 16 mentioned above.

The first support member 22 is generally L-shaped, and while an L-shaped member 23 formed of metal is rotatably attached to the supporting structure 20 at a top portion 24 of the L-shape, at a bottom opposite end 26 the first support member comprises a yoke having clamping forks 28, 30 which are tightenable around a selectively lockable positioner comprising a sleeve 32 which can be positionally adjusted with respect to the remainder of the first support member by selectively loosening a locking bolt 34 and moving the sleeve then tightening the locking bolt once again.

The mounting system 10 further comprises a second support member 36 rotatably attached to the first support member 22 by means of a conventional bearing (not shown) disposed between the sleeve 32 and a grip arm member 38. This allows the second support member to rotate about a second axis of rotation 18. The second axis is orthogonal to the first axis of rotation 16. The second axis of rotation coincides with a longitudinal axis of the positionally adjustable sleeve 32. This allows adjustment of the position of the sleeve with respect to the remainder of the first support member without regard to rotational position, simplifying the procedure.

Figure 2:
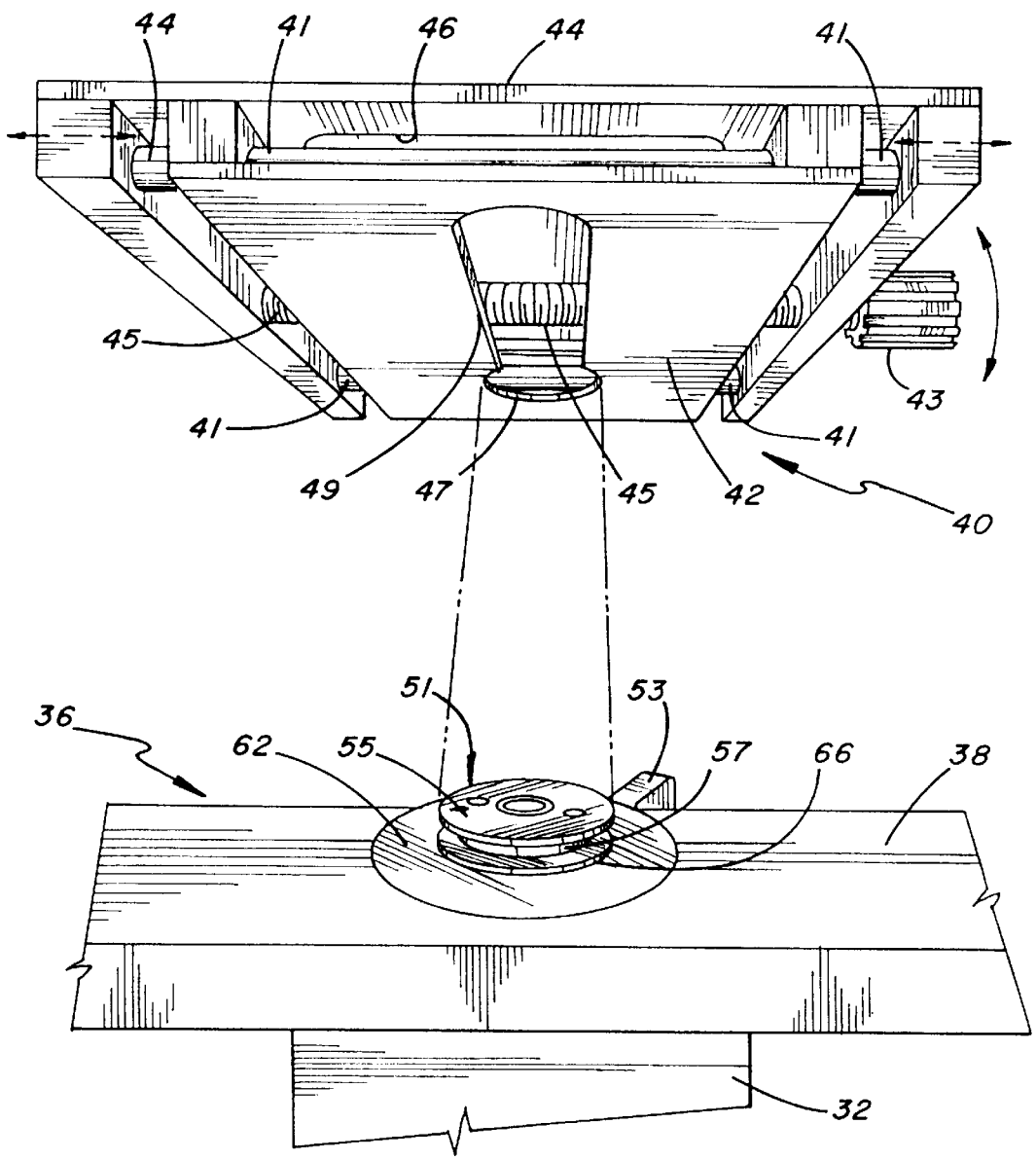
FIG. 2 is a partially exploded perspective view of a portion of the mounting system shown in FIG. 1.
Figure 3:
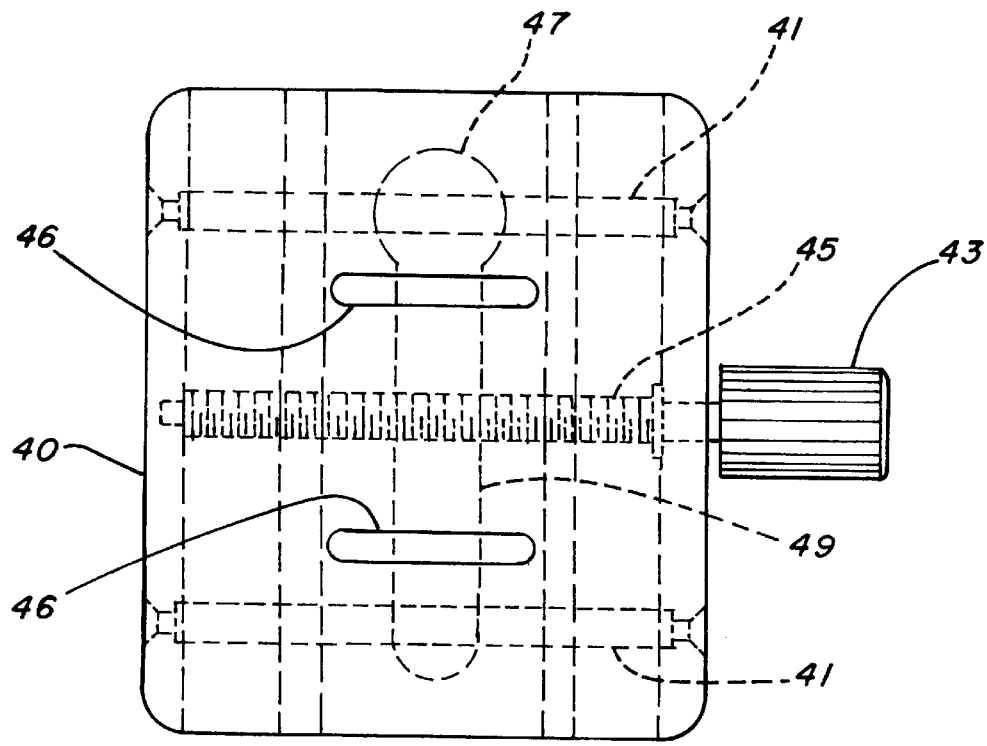
FIG. 3 is a plan view of a camera mount portion of the mounting system shown in FIGS. 1 and 2.
Figure 4:
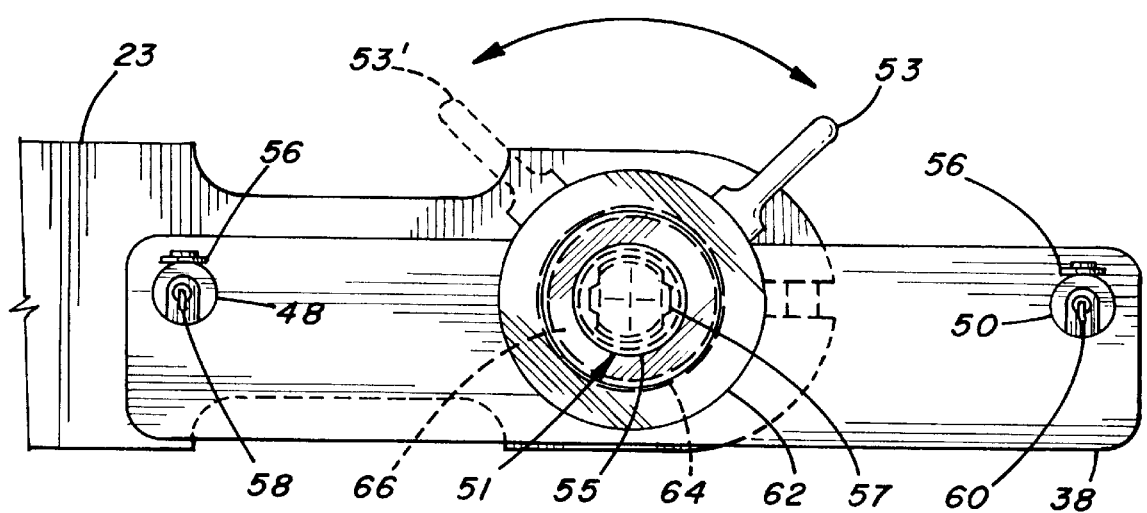
FIG. 4 is a plan view of a portion of the mount system shown in FIGS. 1 and 2 with the mount portion removed.

With reference also to FIGS. 2, 3 and 4, The second support member 36 further comprises a camera mount 40 carried by the grip arm member 38 on an opposite side from, and directly above in FIG. 1, the sleeve 32 and the rotatable bearing connection of the grip arm member to the sleeve. The camera mount includes selectively lockable relative positioning structure and in this regard the camera mount further comprises a stationary plate 42 and a selectively translationally adjustable plate 44 which is slidable with respect to the stationary plate on rods 41 when a threaded rotatable positioning and locking shaft 45 is rotated by means of an adjustment knob 43. This provides translational adjustability in the position of a camera 12 with respect to the second support member 36 in a first direction parallel to the first axis of rotation 16. The threaded shaft 45 holds the plates in fixed relation when not being rotated, and so provides both adjustment and locking functionality.

The translationally adjustable plate further comprises mounting slots 46 accommodating attachment of a channel plate (39 in FIG. 5) of the camera 12 and rough adjustment of the position of the camera with respect to the support member 36 in the first direction. As will be appreciated the channel plate is conventionally used with motion picture cameras, and an equivalent element can be provided for other types of image capture equipment. The channel plate allows fine adjustment of the position of the camera in a second direction which is orthogonal to the first direction and the first axis of rotation.

Rough adjustment of the position of the camera 12 in the second direction is done in attaching the mount 40 to the rest of the mounting system 10. As can be appreciated the camera mount is removed from the second support member 36 and attached to the camera (actually to the channel plate of the camera mentioned above). The camera mount 40 is then attached to the second support member 35 by means of a circular opening 47 and slot 49 which cooperates with a locking post 51 which moves up and down in relationship to a locking collar 62, which moves up and down in relationship to the locking post, by a threaded engagement turned by means of a lever 53 as will be discussed below with reference to FIG. 5.

Again with reference to FIGS. 1–4, the locking post 51 in a released, or up, position with respect to the locking collar 62 allows the camera mount 40 to be attached by passing the circular opening 47 over a larger diameter top portion 55 of the locking post, and then sliding the mount relative to the locking post so that a lower flat-walled portion 57 of the locking post is received in the slot 49. The flat walled portion cooperates with the slot to prevent rotation of the camera mount with respect to the locking post. The camera is rough positioned, and then locked in place by turning the lever 53 which causes the locking collar and locking post to lock the mount 40 in place by a clamping action.

This arrangement provides adjustability of the position of the mounted camera 12 within an area bounded by limits of movement of the camera with respect to the translationally adjustable plate by virtue of the length of the mounting slots 46 and the relative movement allowable between the stationary plate 42 and the translationally adjustable plate 44, and in the orthogonal direction by the movement allowable between the camera mount 40 and the locking post 51 in the slot 49, and the movement of the camera itself in the channel plate 39 as is conventional in the art. This can be appreciated also with reference to FIGS. 3 and 4 which show further details of the system.

Again with reference to FIG. 1, the adjustability of the camera mount 40 which allows adjustability in the location of the camera 12 with respect to the second support member 36 allows the center of mass of the second support member and all attachments to be adjusted with respect to the second axis of rotation 18. Ideally the mount is adjusted so that the center of mass lies on the second axis of rotation. As mentioned above this mitigates a tendency for the apparatus rotatable about the second axis to rotate as a result of acceleration of the apparatus in a particular direction. This is because induced forces acting on the apparatus are balanced with respect to the second axis of rotation. That is to say, that they tend to turn the camera in both directions simultaneously and with the same amount of force.

Likewise by adjustment of the position of the sleeve 32 in the yoke end 26 of the first supporting member 22 the center of mass of the apparatus rotatable about the first axis 16 of rotation can be adjusted. This apparatus would include the first and second supporting members 22, 36 and all attachments, as well as the camera 12. By adjusting the position of the center of mass of apparatus rotatable about the first axis so as to lie on the first axis of rotation, induced forces tending to rotate the camera about the first axis can be nullified. As can be appreciated the first and second axes are coplanar and intersect at the point of intersection 14 of the axes, and accordingly the apparatus rotatable about the second axis of rotation must at least be adjusted so as to be in the same plane as the two axes of rotation before the apparatus rotatable about the first axis can be adjusted so that its center of mass lies on the first axis of rotation.

In practice it has been found that it may be advantageous to place the center of mass of the apparatus rotatable about the first axis 16 slightly below the first axis and on the second axis 18, for example at the point 14' shown. This results in a set-up that is slightly bottom-heavy and will be self righting to a stable upright position. However large accelerations of the camera will tend to induce a moment about the first axis tending to raise photographic axis of the camera from a horizontal orientation inherent in the stable upright position that the camera is biased to due to the slight bottom weighting. This can be easily compensated for by the operator if the distance between the center of mass 14' and the intersection point 14 between axes of rotation is small.

Attached to the grip arm member 38 of the second supporting member 36 are two hand grips 48, 50 which allow manual operator control of the position and pointing of the camera 12. The grips are positioned equidistant from the second axis of rotation 18. This is important so that force generated by differential movement of the camera mount 10 and the operator (not shown) will be transferred to the mounting system substantially equally on both sides of the second axis of rotation 18. Moreover, after adjustment of the respective elements of the camera mounting system 10, balance or a desired amount of bottom weighting for example with respect to the first axis of rotation is achieved and this will be undisturbed by induced forces due to differential movement if the operator grips the grips 48, 50 at locations coinciding with a plane through the first axis. When oriented as shown in FIG. 1 for example the hand grips will be intersected by the first axis of rotation in approximately the middle of the grips with respect to their long axis. For many applications this will be close enough when the operator also grasps the grips approximately in the middle. However, if more precision is desired the location of the optimum point to grasp the grips is easily located, for example by rotating the mounting apparatus rotatable about the first axis while holding chalk or other marking means on the handle. If held sufficiently close to the location of the axis a small circle or a dot marking will result, with the first axis of rotation being at the center of the dot. If the operator thereafter grasps the grips at that location forces transmitted will be applied so as to in the aggregate act through the point 14 where the axes of rotation intersect, or very near below it for example if a bottom heavy set-up is used as discussed above. For more permanent marking, removable tape 52 can be applied to the grips, which tape can be further marked with the exact vertical location of the intersection of the first axis 16 with each grip, in permanent ink 54 for example.

As can be appreciated, some deviation from perfection in aligning the camera 12 with the second support member 36 to axially position the center of mass of the camera and structure that rotates with it about the second axis 18 is possible without seriously degrading the functionality of the mounting system. Likewise some margin for error exists with respect to adjustment of the sleeve 32 within the yoke portion 26 of the first support member 22 so that the center of mass of the camera and structure that rotates about the first axis will be positioned with respect to the first axis of rotation as desired, without seriously degrading functionality. Nevertheless it is possible to nearly perfectly null the effect of induced forces in a moving camera mount system using the system of the invention. It has been found for example that excellent results can be achieved when the system is balanced as described above and the operator provides only very light directional inputs for example by lightly holding the grips between the thumb and one finger of each hand at the location on the grips determined to be the endpoints of a line which has a midpoint coinciding, or very nearly so, with the intersection point 14 of the first and second rotational axes. This situation will inherently result when the mounting system illustrated is properly set up as discussed herein.

With reference to FIGS. 1 and 4, in the illustrated embodiment control of the camera 12 can be effected via controls mounted on the hand grips 48, 50. For example microcontrol switches 56 can be mounted for control of zoom and focus for example. The switches are oriented so as to be actuated by movement parallel to the first axis of rotation 16. Actually very small movement of the switches actuates them, but orientation in this manner nullifies any transfer of force to the mounting system 10 as the motion of the switches acts along lines through the second axis of rotation, or very nearly so, and parallel to the first axis of rotation. If oriented so as to be actuated up and down (parallel to the second axis of rotation) there is a possibility that an operator may transfer sufficient force to cause a rotational movement about the first axis of rotation 16. Further controls in the form of switches 58 and 60 mounted in the top of the hand grips 48 and 50 respectively, can be provided to control other aspects of camera function, such as a record/stop function in a video camera, or the film and shutter motions in a motion picture camera, and the like, for example.

Figure 5:
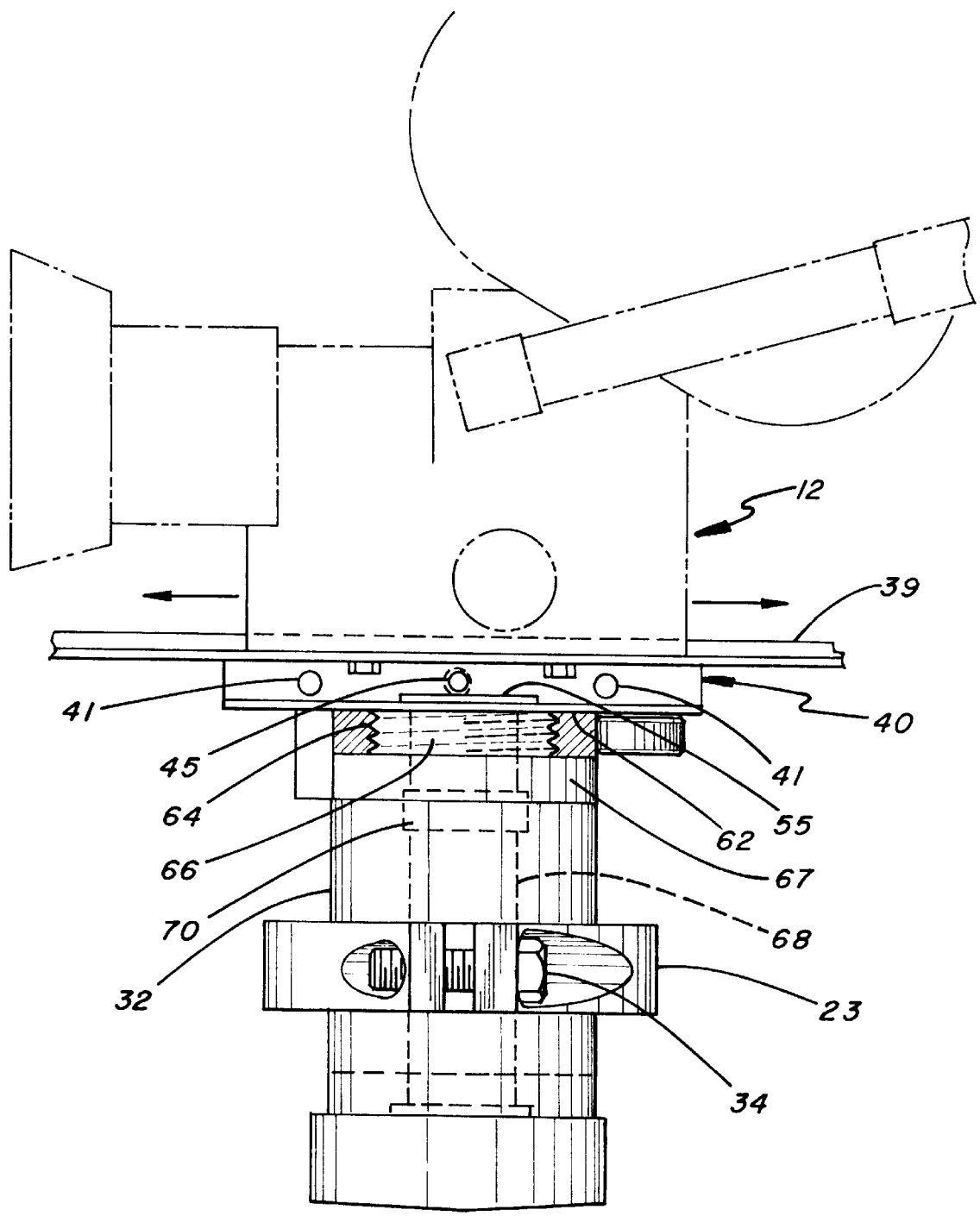
FIG. 5 is an elevation view of a portion of the mount system taken from line 5—5 in FIG. 1.

With reference to FIGS. 4 and 5, it can be seen that the locking action of the locking post 51 and locking collar 62 is actuated by means of the lever 53 that actuates the collar. A threaded engagement between the locking collar 62 having a threaded inner circumference 64 and a corresponding threaded outer circumference of an axially upwardly extending portion 66 of a lower collar 67 attached to a pan axle 68 that extends down into the sleeve 32 provides relative movement between the locking collar and locking post as the locking post 51 is rigidly affixed to the top of the pan axle. The pan axle is carried by and stabilized with respect to the sleeve 32 of the first support member 22 by at least one bearing 70 which is conventional. A low friction collar washer (not shown) can be placed on top of the locking collar to allow the locking collar to move more easily in rotational movement as the clamping force generated increases.

With reference again to FIG. 1, the invention provides a further advantage inherently, that being that it is not necessary to know beforehand the location of the center of mass of the camera 12 used. By mounting the camera and adjusting its location with respect to the respective axes 16, 18 guided by balance in rotation about the respective axes, the center of mass can be correctly located without having prior indication of the location of the center of mass. This enables cameras of different make and configuration to be used with the mounting system 10, with minimal time and effort required to adjust the system to accommodate a different camera. As can be appreciated this provides increased flexibility in use which was not possible with prior counterbalanced steady camera mounting arrangements which required use of a particular camera for which the center of mass was known.

As will no doubt be apparent to those skilled in the art, the first axis of rotation is the tilt pivot or tilting axis of the mounted camera 12, and the second axis of rotation 18 is the pan pivot or panning axis of the mounted camera. In the illustrated embodiment the panning axis is oriented vertically so as to be plumb, and the tilt axis is oriented orthogonally, being level and parallel to the horizon. However, the invention is not necessarily limited to this configuration. The first axis instead could be plumb and the second axis horizontal, for example if the camera mount system is mounted on a counterbalanced rig (not shown) allowing the camera to translate vertically without rotation being induced.

The invention in one embodiment, as shown in FIG. 1 for example, is contemplated to be carried by a counterbalanced beam (20 for example), and the rotational mounting of the first support member 22 with respect to the beam eliminates the transfer of rotational motion to the mounting system from the beam as the camera translates vertically. In this embodiment the invention provides another result that sets it apart from conventional manually operated camera mount systems. The order of pan and tilt is established differently in the illustrated embodiment of the system of the invention.

The panning structure of prior systems is attached directly to the supporting structure, such as a pedestal, and the tilting structure is in turn carried on that. This order allows straight panning only if the tilting structure is positioned to orient the optical axis of the camera in the horizontal plane. Otherwise the entire supporting structure must be tilted to pan straight in a plane oriented obliquely with respect to the horizon. Normally with conventional equipment panning when the optical axis of the camera is tilted defines an arc; and when the camera is tilted to a vertical orientation no panning is possible, as the camera simply rotates about the vertical axis. Contrastingly in the illustrated embodiment of the mounting system in accordance with the invention the order of pan and tilt is reversed, and allows straight panning in tilt orientations oblique to the horizontal.

The mounting system 10 can be constructed from metal, and in the illustrated embodiment the system is formed of aluminum, aluminum alloy, and in portions where higher stresses will be present, stainless steel. Surfaces can be anodized, painted, powder-coated or otherwise treated to provide a better appearance and reduce unwanted reflections of light. The hand grips can be finished with an elastomeric high friction covering, for example a closed-cell foam of elastomeric polymer resin. The outer surface of the foam can be abraded to open the outer cells provide a surface with an even greater coefficient of friction. The upper portion of the grips can be formed of a polymeric resin such as DELRIN.

From the forgoing it will be appreciated that the problem of pointing error resulting from differential motion of the camera and operator in manually operated image capture systems is mitigated as a result of the invention which provides a mounting system that is simple to construct and use. Because forces resulting from differential motion are transferred to the camera through the grips located on opposite sides and equidistant from the second axis of rotation, or pan pivot axis, such forces are directed parallel to the optical centerline (axis) of the camera. Accordingly translational movement along the optical axis, with minimal disturbance of the recorded image, results. This is in contrast to rotational motion being imparted which would cause much more noticeable change in the recorded image.

Moreover, the invention results in a more stable mounting in terms of having less tendency to rotate about pan and tilt axes due to acceleration forces acting on the camera through the mount (for example as a result of mounting on a moving vehicle which changes direction or rotates). This later advantage being derived from the ability to locate the mass centers of structure rotatable about each of said axes on or very near these axes. The later advantage is realized without having to determine beforehand the location of the center of mass of the particular camera being used. These advantages can be very beneficial to those using image capture equipment, and enable new creative possibilities.

While the forgoing detailed description constitutes the presently preferred embodiment(s) of the invention, it will be appreciated that variations, changes and modifications can be made without departing from the spirit and scope of the invention and the fair meaning and scope of the accompanying claims.

What is claimed is:

1. A camera mounting system facilitating mounting a camera on a movable object and minimizing pointing error due to motion of the camera and an operator, the camera having a center of mass, comprising:
   a panning support member including accommodation for mounting a camera, rotatable about a pan axis of rotation, said panning support member being carried by the movable object and having a center of mass, and the combination of the panning support member and the camera having a center of mass, the camera panning support member enabling the camera to be mounted so that the axis of rotation of the panning support member intersects the center of mass of the combination of the camera and the panning support member;
   a pair of operator hand grips connected to the panning support member, the hand grips being positionable with respect to the axis of rotation so as to be equidistant from the axis of rotation and lie on a straight line intersecting the axis of rotation.

2. The mounting system of claim 1, further comprising a tilting support member on which the panning support member including a camera mount is rotatably carried, the tilting support member being rotatable about a tilt axis of rotation and carried by the movable object, said tilting support member having a center of mass and a combination of the tilting support ember and the panning support member and the camera having a center of mass, the pan and tilt axes of rotation being orthogonal to one another, said camera mount being positionable with respect to the tilt support member so that the center of mass of the combination of the tilting support member and the panning support member and the camera is positionable so as to lie on the tilt axis of rotation.

3. The mounting system of claim 2, wherein the position of the center of mass of the combination of the tilting and panning support members and the camera is adjustable whereby the center of mass of the combination of the tilting and panning support members and the camera can be aligned with the tilt axis of rotation and the pan axis of rotation.

4. The mounting system of claim 1, wherein said camera mount further comprises an accommodation for translational adjustability in a first direction which is releasably lockable and an accommodation for translational adjustability in a second direction orthogonal to the first direction which is releasably lockable.

5. The mounting system of claim 4, further including an accommodation incorporated in the mounting system for translational adjustability of the camera in a third direction orthogonal to both the first and second directions which is releasably lockable.

6. The mounting system of claim 5, wherein the tilting support member further comprises a clamping portion and a sleeve selectively slideable in the clamping portion, the panning support member being rotatable carried on the sleeve rotatable about the panning axis whereby adjustability of the center of mass of the combination of the tilting and panning support members and the camera in a direction parallel to the panning axis is facilitated.

7. The mounting system of claim 6, where the tilting axis is oriented horizontally.

8. A mounting system for a image capture device manually pointable by an operator, the image capture device having a center of mass, comprising:
   a first support member rotatable about a first axis of rotation;
   a second support member carried by the first support member, the second support member being rotatable about a second axis of rotation orthogonal to the first axis of rotation, said first and second axes of rotation intersecting at a point of intersection;
   an image capture device mount attached to said second support member, the image capture device mount enabling the image capture device to be mounted so that a center of mass of the combination of the first and second support members and the image capture device coincides with the point of intersection of the first and second axes;
   a pair of operator grips configured for transferring operator induced forces to the second support member whereby the image capture device is pointable by the operator, the pair of operator grips being connected to the second support member such that an imaginary line having an end point at each operator grip can be constructed so as to have a midpoint that coincides with the second axis of rotation; the mounting system mitigating the effects of differential movement between the image capture device and the operator so as to minimize pointing error introduced by such differential movement.

9. The mounting system of claim 8, wherein the midpoint of said imaginary line coincides with the point of intersection of the first and second axes.

10. The mounting system of claim 8, wherein the device mount further comprises a selectively lockable movable connection between the image capture device and the second support member enabling a center of mass of the combination of the second support member and the image capture device to be aligned with said second axis of rotation.

11. The mounting system of claim 8, further comprising a selectively lockable positioner for relatively positioning the second support member with respect to the first support member, enabling a center of mass of the combination of the first and second support members and the image capture device to be aligned with the first axis of rotation.

12. The mounting system of claim 11, wherein the selectively lockable positioner comprises a sleeve selectively movable within a tightenable yoke.

13. The mounting system of claim 12, wherein the sleeve is circular.

14. A mounting system for a camera, comprising:

a first support member rotatable about a first axis of rotation;

a second support member carried by the first member and rotatable about a second axis of rotation, the second support member including a camera mount accommodating a camera having a center of mass;

a pair of operator hand grips, each hand grip being connected to the second support member, the first and second axes of rotation being orthogonal and intersecting at a point of intersection; and the pair of hand grips being positioned so that an imaginary line having a center point equidistant from two end points can be constructed so that the center point coincides with the second axis of rotation at the point of intersection of the first and second axes and the end points are positioned at the hand grips, the position of the camera mount being adjustable so that a center of mass of the combination of the second support member and the camera can be positioned on the second axis of rotation.

15. The mounting system of claim 14, wherein the position of the camera mount is adjustable so that a center of mass of the combination of the first and second support members and an attached camera is positionable at and adjacent the point of intersection of the first and second axes.

16. The mounting system of claim 14, wherein the first support member further comprises a releasably lockable positioner facilitating adjustment of the position of the second support member with respect to the first support member so that a center of mass of the combination of the first and second support members and the camera when attached can be adjusted to coincide with the first axis of rotation.

17. The mounting system of claim 14, wherein the first support member depends from a balanced beam carrying the mounting system in a floating manner.

18. The mounting system of claim 14, wherein the second support member further comprises a hand grip arm member rotatably supported by the first support member, the hand grip arm member carrying the camera mount and the pair of hand grips.

19. The mounting system of claim 18, wherein the first support member comprises a selectively lockable positioner allowing adjustment of the position of the second support member with respect to the first support member, the second support member being rotatably mounted on the positioner.

20. A mounting system for minimizing pointing error in human operated camera equipment carried by structure mounted on a moving object and allowing manual operator directional control in pointing the camera, the operator being also carried by the moving object, comprising:

a first support member adapted to be rotatably carried by the structure mounted on the moving object, the first support member being rotatable about a first axis of rotation;

a second support member rotatably carried by the first support member, the second support member being rotatable about a second axis of rotation; the first axis of rotation being orthogonal to the second axis of rotation and the first axis of rotation intersecting the second axis of rotation, the position of the second support member being translationally adjustable in a direction parallel with the second axis of rotation, the second support member furher comprising an adjustable camera mount facilitating attachment of a camera and adjustment of the position of the camera so that a center of mass of the combination of the first and second support members and the camera can be made to lie on the first and second axis of rotation, the camera mount also facilitating said camera being carried by the second support member in fixed relation thereto;

two operator grips, graspable by the operator, connected to the second support member, said grips being positioned so that an imaginary line intersecting the grips will pass through the second axis of rotation at the point of intersection with the first axis of rotation and the operator grips are equidistant from the second axis of rotation, whereby the center of mass of the combination of the first and second support members and the camera can be positioned at the point of intersection of the first and second axes and unbalanced forces between the operator and the mounting system being directed substantially through the center of mass of the rotatable portions of the mounting system combined with the camera via the grips mitigating a tendency to introduce pointing error due to rotation of the camera about either of the first and second axes.

* * * * *